(12) United States Patent
Lee

(10) Patent No.: US 8,738,786 B2
(45) Date of Patent: May 27, 2014

(54) METHOD FOR PROTECTING CLIENT AND SERVER

(76) Inventor: Sanggyu Lee, Seoul (KR)

(*) Notice: Subject to any disclaimer, the term of this patent is extended or adjusted under 35 U.S.C. 154(b) by 236 days.

(21) Appl. No.: 12/301,232

(22) PCT Filed: May 17, 2007

(86) PCT No.: PCT/KR2007/002411
§ 371 (c)(1),
(2), (4) Date: Nov. 17, 2008

(87) PCT Pub. No.: WO2007/136192
PCT Pub. Date: Nov. 29, 2007

(65) Prior Publication Data
US 2009/0193074 A1    Jul. 30, 2009

(30) Foreign Application Priority Data

May 18, 2006 (KR) .................. 10-2006-0044601
Mar. 20, 2007 (KR) .................. 10-2007-0027161

(51) Int. Cl.
*G06F 15/16* (2006.01)

(52) U.S. Cl.
USPC ........................................ 709/229

(58) Field of Classification Search
USPC ........................................ 709/229
See application file for complete search history.

(56) References Cited

U.S. PATENT DOCUMENTS

| 6,496,847 B1 * | 12/2002 | Bugnion et al. ............... 718/1 |
| 6,757,729 B1 | 6/2004 | Devarakonda et al. |
| 6,799,197 B1 | 9/2004 | Shetty et al. |
| 7,099,948 B2 | 8/2006 | Tormasov et al. |
| 7,117,495 B2 | 10/2006 | Blaser et al. |
| 2002/0013910 A1 | 1/2002 | Edery |
| 2002/0199007 A1 | 12/2002 | Clayton et al. |
| 2003/0135468 A1 | 7/2003 | Barbir et al. |
| 2005/0198303 A1 | 9/2005 | Knauerhase et al. |
| 2006/0074949 A1 * | 4/2006 | Haruna et al. ............... 707/100 |
| 2006/0155735 A1 | 7/2006 | Traut et al. |
| 2007/0050770 A1 | 3/2007 | Geisinger |
| 2010/0005531 A1 * | 1/2010 | Largman et al. ............... 726/24 |

FOREIGN PATENT DOCUMENTS

| JP | 10-154078 A | 6/1998 |
| JP | 2001-318797 A | 11/2001 |
| WO | 02/099673 A1 | 12/2002 |
| WO | 2005/027402 A1 | 3/2005 |

OTHER PUBLICATIONS

Stockman, Mark et al. "Centrally-Stored and Delivered Virtual Machines in the Networking/System Administration Lab" Jun. 2005, ACM, 2 Penn Plaza, Suite 701 New York, USA, XP040023068, pp. 4-6.

(Continued)

*Primary Examiner* — MaCeeh Anwari
(74) *Attorney, Agent, or Firm* — Haynes and Boone LLP

(57) ABSTRACT

A service provider provides a service to a service user using a client server based system executed in network, such as Internet, Intranet and Extranet. If the service user request a service to the service provider, the service provider installs a protection space within system of the service user and executes programs requested by the service user within the protection space, thereby both the system of the service user and the system of the service provider are securely protected. A software distritution based on distribution of virtual machine makes a user who is not familiar with a computer use the PC in a easy and speedy way.

18 Claims, 5 Drawing Sheets

(56) References Cited

OTHER PUBLICATIONS

Nieh, Jason et al. "Examining VMWare" Aug. 1, 2000, Dr. Dobb's Journal, M&T Publ., Redwood City, CA, pp. 70-76.
Garfinkel, Tal et al. "Terra: A Virtual Machine-Based Platform for Trusted Computing" Oct. 19, 2003, ACM SOSP Proceedings of the ACM Symposium on Operating Systems Principles, pp. 193-206.
Supplementary European Search Report; EP Application No.; EP 07 74 6559; Feb. 19, 2010, 2 pages.
Office Action issued on Dec. 13, 2010 for KR Pat App No. 10-2009-0001739, 4 pages.
European Office Action dated Oct. 12, 2012 issued in European counterpart European Application No. 07 746 559.9, 7 pages total.
Japanese Office Action dated Jul. 3, 2012 issued in Japanese counterpart Japanese Application No. 2009-510892, 4 pages total.
Machine translation of Japanese Office Action dated Jul. 3, 2012 issued in Japanese counterpart Japanese Application No. 2009-510892, 6 pages total.
Machine translation of JP 2001-318797, 44 pages total.

* cited by examiner

Layered File System    Layered Registry System

METHOD FOR PROTECTING CLIENT AND SERVER

TECHNICAL FIELD

The present invention relates to a method for protecting a service providing system of a client/server paradigm from an external hacking attack, which is constructed and operated in a network environment including an intranet or an extranet environment. More specifically, a protection space independent from an existing operating system environment is created in a client system, and client applications are executed only within the protection space. A server application trusts only those network packets created by a client application executed within the protection space. Therefore, a server system and/or a client system can be protected from an attack of an external hacker.

BACKGROUND ART

Generally, a service providing system executed in a network environment comprises a service user (hereinafter, referred to as a user) configuring a client and a service provider (hereinafter, referred to as provider) configuring a server. The provider installs server applications in the server, and the user installs client applications, which are application programs distributed by the provider, in its system in order to use provider's services. The server applications interact with the client applications to provide the services. However, in many cases, the user cannot trust the provider, and inversely, the provider also cannot trust the user. Such a lack of trust hampers development of service industry that is based on information technology (IT) and is abused as means for crimes at times.

Since the application programs distributed by the provider can be a malignant program, such as a spyware or an addware, or some of configuration files may be infected with computer viruses, the user cannot trust the provider. In this case, if a malignant program or a file infected with a virus is installed, a user system also will be infected with the malignant program or virus.

Inversely, since the user system is generally vulnerable in security, the provider cannot trust the user. A provider system becomes vulnerable due to the vulnerability of the user system. Occasionally, the user can analyze the application program distributed by the provider through a reverse engineering technique and hack important logics. In a financial transaction service, such as Internet banking or the like, internal logics should be protected from hacking, and an enterprise that provides business services to cooperative enterprises through an extranet should protect its service system not to be unstable due to vulnerability in security of a cooperative enterprise's system.

A variety of methods for constructing mutual reliability between such a client and server has been proposed. In a conventional service provided through a network environment, a client side security apparatus for protecting a hacking attack includes an anti-virus product, a patch management system, and the like, and a server or network side security apparatus includes a network firewall, a web firewall, a vulnerability scanner, a source code analysis tool, and the like. Hereinafter, details and limitations of each technique will be described.

The anti-virus product diagnoses each file using a signature list of well-known malignant codes and determines whether the file is infected with a malignant code. However, since the signature list may not contain a malignant code until the malignant code becomes well-known and is reported to a call center, there is a limitation in diagnosing the malignant code.

The patch management system applies a latest security patch to an operating system or an application, thereby maintaining a personal computer (PC) in a secure state. However, a vulnerable point for which a patch is not released cannot be protected.

The network firewall blocks an attack of an external hacker on a vulnerable point existing in the network layer, i.e., layer 3 of open systems interconnection (OSI) 7 layers, and the transportation layer, i.e., layer 4 of OSI 7 layers.

FIG. 1 is a view conceptually showing functions of the network firewall 150, in which a user establishes an access control rule 151 using an Internet protocol (IP) address and a port number on the basis of the network firewall and blocks network packets of an unauthorized attacker.

For example, if a user 100 authorized to use file transfer protocol (FTP) services tries to connect to an FTP service 160, the network firewall 150 permits a corresponding connection, and if a person 110 who is not authorized to use FTP services tries to connect to an FTP service 160, the network firewall 150 blocks a corresponding connection. However, since the connection is permitted or rejected based on an IP address and a port number when the network firewall is used, if an attacker hacks into an authorized person's machine and attacks by way of the authorized person's machine or an authorized person attacks with a bad will, there is no way to protect such an attack.

On the other hand, since all users 120 are permitted to access a web service 170, the network firewall 150 permits all packets headed for the web service 170. However, if a web application of a server that is open to outside such as web service is vulnerable, anyone can attack a corresponding vulnerable point, and thus the network firewall 150 cannot protect the vulnerable point from an attack of an external hacker. That is, the network firewall 150 can control services to be permitted and services not to be permitted, but cannot protect an attack on a vulnerable point of a permitted service.

An application firewall has been introduced to solve above problems. The application firewall operates in the application layer, i.e., layer 7 of OSI 7 layers, and thus can recognize a variety of protocols, such as hyper text transfer protocol (HTTP), file transfer protocol (FTP), simple message transfer protocol (SMTP), and the like, and can protect an attack on a vulnerable point existing in a corresponding application.

FIG. 2 shows a web application firewall 220, which is a typical application firewall. The web application firewall 220 is provided with a packet filter system 222 and operates in a packet filtering method, in which a received packet is compared with a predefined pattern 221. If the received packet is a malignant packet 200, the packet is blocked, and if the received packet is a normal packet 210, the packet is transmitted to a web server 230.

However, since the web application server 220 creates the pattern 221 based on a known attacking technique, there is a problem in that an attacker can easily detour the pattern filter system 222 by slightly transforming an existing attacking technique, and an unknown attacking technique cannot be protected. Since all incoming packets should be compared with tens of thousands of predefined patterns 221, speed of a web service is significantly slowed down. Furthermore, if a normal packet 210 matches to a predefined pattern 221 by chance, the packet is mistakenly regarded as a malignant packet, and thus there may be a side effect such that a normal user is blocked from using a web service.

In addition, since the web application firewall 220 can monitor only general attacking patterns, a vulnerable point localized to a specific web site is difficult to be protected. For example, since an attack that changes a merchandise price from 10,000 Korean Won to 1,000 Korean Won in a web site related to home shopping is meaningful only to a corresponding site, the web application firewall 220 cannot effectively protect such attacks.

The web application firewall 220 is a method of blocking an attack on a vulnerable point of an application, leaving the corresponding vulnerable point as is. Contrarily, a vulnerability scanner or a source code analysis tool uses a method of removing a vulnerable point itself.

The vulnerability scanner is a tool that checks existence of vulnerable points by transmitting packets for diagnosing existence of vulnerable points from outside of an application server and confirming responses thereof, and the source code analysis tool is a tool that directly examines a source code and determines existence of vulnerable points.

FIG. 3 is a view showing the process of using the vulnerability scanner and the source code analysis tool. If development of an application is started 300, generally, a design and coding step 310 is gone through. If a certain part of the application is completed, a vulnerability analysis step 320 is performed, in which the vulnerability scanner or the source code analysis tool is executed in order to confirm whether vulnerable points exist in the code created until then. At this point, if vulnerable points are found, the application performs a modification step 330, which is iterated until all the vulnerable points are removed, and then the development is finished 340.

Generally, a vulnerability scanner or a source code analysis tool only shows existence of vulnerable points in security, and removing the security vulnerable points is the work of developers. Accordingly, the developers should have expertise in vulnerabilities as much as high-class hackers in order to remove the security vulnerable points, and a considerable amount of cost and time is required to remove the vulnerable points. In addition, as is the same with the application firewall, there is a weak point in that the vulnerability scanner or the source code analysis tool cannot find out a vulnerable point localized to a specific web site, such as changing a merchandise price from 10,000 Korean Won to 1,000 Korean Won.

On account of such reasons, according to a conventional technique, a fundamental security system for enhancing reliability of a network-based client/server system is difficult to construct. Hereinafter, a new method for overcoming technical limitations of the conventional security system mentioned above will be described in detail.

On the other hand, in a client/server service providing system, it is general that a provider distributes users a client application needed for providing services and guides the users to use the client application. However, although distribution of the client application is indispensable for providing services, measures to deal with security are inadequate, and thus current method of distributing the client application is unstable. Therefore, the current distribution method becomes another important factor degrading mutual reliability of the service providing system.

A typical method of distributing service users an application program needed for providing services in a conventional way includes an Active X control method, a program direct installation method, and a streaming method. Hereinafter, details and limitations of each technique will be described.

The Active-X control method is frequently used for a web service. The service provider creates software needed for providing services in an Active-X control form and records the software on a webpage. If a user visits a corresponding webpage, a user's web browser inquires the user whether to install the Active-X control in the PC, and if the user agrees, the Active-X control is installed.

The Active-X control method is advantageous in that a program can be conveniently installed. However, an Active-X control to be installed occasionally happens to be a malignant code, such as an adware or a spyware. On this account, there is a problem in that a PC is unknowingly infected with a malignant code while web-surfing. In order to solve the problem, a system for determining security of a control based on whether a certificate is issued by a reliable authentication institution is nation-widely adopted. However, a system will always have a loophole such that even an adware manufacturer can acquire a certificate if the adware manufacturer pays a certain amount of fees, and if the option of confirming an electronic signature is turned off in a web browser, such a system is of no use at all. In addition, if a vulnerable point in security exists in a normal Active-X control, it is possible to hack a user's PC through such a vulnerable point.

The program direct installation method is a method in which a user downloads an installation program such as Setup.exe and installs software by executing the downloaded installation program. The installation program method fundamentally has the same problems as the Active-X method.

Since the Active-X control method or the installation program method directly installs software in a client system, problems of version collision, complexity of installation, capacity of the system, and the like will occur. To solve the problems, a streaming type software distribution method has been introduced.

The version collision is a problem such that when a shared library called as ab.dll is simultaneously used by software A and B, if software incompatible to a currently used version is installed, or another piece of software updates a corresponding file, the file operates abnormally.

In the streaming method, software of a client/server environment is not directly installed in a client operating system, but a streaming image in which software is installed is used instead. If a process calls ab.dll, a streaming client search for ab.dll from the streaming image and returns the searched file to the process, thereby emulating as if ab.dll exists although ab.dll actually does not exist in the operating system. In this case, since the file is not directly installed in the operating system, problems of version collision, complexity of installation, and the like can be solved. In addition, since not entire system is installed, but a streaming server fetches only a currently needed file or registry, the problem of system capacity can also be solved.

However, the streaming method only emulates a file, a registry, and the like that do not exist in the operating system as if they exist at the application level, and virtualization on the operating system level is not provided. Therefore, an application program is directly executed in the operating system, and a system process, a service process, and an operating system kernel are also shared by a process executed in the streaming server and a general process. Accordingly, if the streaming method is used, modifications of the operating system brought by the installation of an application program can be protected. However, in the aspect of security, a service provider or a service user system cannot be efficiently protected from the problems occurred in the process of executing the application program.

As a result, a conventional method exercised by a provider to distribute a needed application to users in a client/server-based service providing system has a problem in that mutual reliability cannot be constructed. Hereinafter, the present invention proposes a new method that overcomes technical limitations of the conventional client application distribution method described above, which will be described in detail.

On the other hand, recently, studies on a virtual machine are actively under progress. The virtual machine is a concept introduced in 1960s to share a mainframe in the form of a plurality of virtual machines. However, as the price of a microcomputer or a PC is lowered, purchasing a plurality of PCs is further advantageous than sharing a mainframe from the aspect of cost, and thus the virtual machine technique is scarcely used in 1980s. However, in 1990s, using a plurality of small-capacity computers rather increased management and maintenance cost. Further, efficient use of computing resources has become an issue (for example, occasionally, server A uses the CPU 10%, whereas server B uses the CPU as much as 99%), and thus the virtualization technique attracts concern again. However, a virtualization technique for efficiently managing resources of a large-scale server is the mainstream, and studies on a virtualization technique for a client system are insufficient yet.

It is mentioned in advance that a virtual machine is operated in a client system in order to install and execute a client application in the present invention.

The method of implementing a virtual machine is diverse. Arranging the methods of implementing virtualization known until today, there are command set level virtualization, para-virtualization, library level virtualization, application level virtualization, operating system level virtualization, and the like.

In the command set level virtualization method, the central processing unit, memory, chipset, bus, and a variety of peripherals (a network card, hard disk, floppy disk, and CD-ROM) are emulated in software to create a virtual machine. In the command set level virtualization method, all commands created in the virtual machine are processed by software, and thus there are many problems in performance, such as degradation in processing speed.

In the para-virtualization method, it is not to emulate a command contrarily to the command set level virtualization method, but to modify a source code or a binary code of an operating system to execute a plurality of operating systems in a hardware machine. Recently, a CPU that allows a plurality of operating systems to be executed in a single hardware machine without modifying the operating systems is developed. In the para-virtualization, since a command set is not reanalyzed in software, processing speed is improved.

Since a completely independent operating system can be installed in each virtual machine, the command set level virtualization method and the para-virtualization method are appropriate for server virtualization, such as a virtual private server (VPS), server integration, and the like, and they are utilized in the fields of software development, test, and the like. However, these methods have some problems to be used for virtualization of a client system pursued by the present invention. They are inconvenient in that a new operating system should be installed in each virtual machine, and as many operating system licenses as the number of virtual machines should be purchased.

The library level virtualization method is a method of virtualizing libraries within an operating system. Specifically, it is a method of virtualizing application program interfaces (APIs). For example, Windows Emulator (WINE) implements Win32 API in a UNIX/X system to execute a Windows application on the UNIX, or contrarily, the Windows provides POSIX or OS/2 subsystems.

The application level virtualization method is a method that creates an application in the form of a bytecode, like Java Virtual Machine developed by Sun MicroSystems, which allows an application to be executed in a variety of heterogeneous hardware and software environments.

Finally, the operating system level virtualization method is a method of virtualizing each constitutional element of an operating system (a processor, file system, network resource, system call interface, name space, and the like). Conventional operating system level virtualization methods have been developed mainly for the purpose of server virtualization, such as a Virtual Private Server (VPS).

When a VPS is implemented using a full virtualization or para-virtualization method, memory and hard disk resources required by a virtual machine are the same as those of a real machine, and thus it is difficult to create a plurality of virtual machines in a physical machine. However, since all virtual servers can be driven by an operating system if the operating system level virtualization is used, resources needed for driving an operating system in an individual virtual machine are not required, and a plurality of virtual machines can be driven with a small amount of resources compared with the full virtualization or para-virtualization method. Or otherwise, the operating system level virtualization method has been used as a method for efficiently providing an independent operating system space to a user who needs a plurality of operating system environments for the purpose of software development and test.

Virtualization techniques are currently much used in the fields of server integration, software development and test, and hosting. In the field of security, studies are mainly progressed in the manner of executing an unreliable application in a virtual machine, i.e., unreliable programs are executed in a virtual machine to protect a host operating system or to test whether a malignant program is concealed. However, in a method for a client/server-based service providing system, studies on a security technique for client applications and server applications using a virtual machine have not been yet progressed. In addition, as is described below, any conventional virtualization method is not adequate for the client/server-based service providing system. In the present specification, a new virtualization method that is different from conventional virtualization is proposed.

On the other hand, conventionally, in order to use a personal computer, needed is knowledge that is somewhat complicate to access for an ordinary person who is ignorant of a computer, such as knowledge of operating systems, program installation, and program setting. Personal computers are exclusive possessions that only a few experts can freely use. If a personal computer is to be a popular home appliance, such as a television set or a refrigerator, the computer should be much easier to use than now. In the case of a television set, a user can easily and rapidly watch a desired program only if the user can switch channels using a remote controller. Computing environments should be changed so as to use a computer as easily as a television set.

In order to easily distribute a computing environment, a variety of techniques, including a graphic user interface (GUI), has been provided. However, even today, a method of installing and setting a program is still not easy for an ordinary person to access, and a variety of viruses and malignant programs make ordinary people more difficult to use a computer.

DISCLOSURE OF INVENTION

Technical Problem

The present invention has been made in order to solve the above problems, and the present invention is directed to a system and a method for providing a computing environment that is secure for both a service user and a service provider.

The basic configuration of a technique of the present invention can be summarized in the steps described below. That is, first, the user requests using a service from the provider, second, the provider automatically creates a protection space independent from a user system, and third, a needed application program is executed only within the created protection space, and thus there is provided a computing environment that is secure and convenient for both the user and the provider. Based on such configuration, the present invention pursues a variety of purposes described below.

A first object of the invention is to securely protect the service user system. Specifically, since a client application distributed by the provider is installed and executed only in the protection space, although a malignant code exists in the distributed client application, a system outside of the protection space or other protection spaces are not infected. Accordingly, the user can request a service from the provider without anxiety, and the user system is securely protected.

A second object of the invention is to securely protect a service provider system. Specifically, if the user requests a service, the provider forcibly and automatically creates a protection space in the user system. Application programs are installed and executed only within the protection space, and packets transmitted to the server are isolated from a variety of threatening factors existing outside of the protection space within the user system. Preferably, the service provider itself creates the protection space within a service user's machine. However, a third person can create a protection space in the user's machine following a service provider's order. In the present specification, such technical modifications are all considered as a protection space created by the service provider. Preferably, client objects are verified so that the user cannot manipulate the client application. Preferably, integrity of transmission data, such as packets or the like, is additionally verified against a hacker's intercept attack on a network. Accordingly, the provider system is securely protected from hacking.

A third object of the invention is to securely protect the provider system and the user system at the same time. A conventional client security product includes anti-virus, anti-key-logger, PC firewall, or the like, which protects the client system from being hacked or infected with a malignant code, and protects important information stored in the client system from being leaked. A conventional server security product includes a network firewall, application firewall, vulnerability scanner, source code analysis tool, or the like, which blocks packets transmitted to the server at the network level or confirms whether a server application has a vulnerable point.

The conventional client security product protects only the client system, and the conventional server security product protects only the server system. However, the protection space, client object verification, and integrity verification complement one another in the present invention, and thus both the client system and the server system can be simultaneously protected. In addition, the client system and the server system can be efficiently protected even from an attack of unknown type or a zero day attack.

A fourth object of the invention is to use a virtualization technique in the method of creating a protection space within a user system and in the method of distributing a client application performed by the provider. If the provider distributes a virtual machine image where one or more application programs needed for using a service are stored or pre-installed, creation of a protection space and distribution of the programs can be simultaneously, securely, and conveniently accomplished. The pre-installed virtual machine image means that applications are already installed or data needed for installation is contained in the image.

A fifth object of the invention is to receive a plurality of application programs easily and promptly using a virtual machine image. Conventionally, a user himself or herself should construct a computing environment needed for using a service. Knowledge of an expert is required in order to install programs to be used or adjust various settings. However, an environment is needed, in which whoever ignorant of a computer can conveniently and easily access to an environment installed with programs desired by the user. In addition, it is required to provide a computing environment, in which all troublesome conventional processes of purchasing, installing, and setting programs are omitted, and all programs desired by the user are installed with only a few clicking operations.

In the present invention, a computing environment needed for using a service is constructed not by the user, but by the service provider. Since the user only need to use the provided computing environment as is, the user can use the service of the provider as easily and securely as switching channels of a television set without expertise on a personal computer or security. Specifically, the user does not install software one by one, but loads a virtual machine image provided with all software and environments needed for using a service, and thus the user can use the service in an easy and speedy manner.

Technical Solution

In order to accomplish the above objects of the invention, there is provided a service providing system that both the service user and the service provider can trust.

According to one aspect of the invention, a protection space is installed in a user system, and a client application is executed only in the protection space. In the present invention, the protection space means a space that is protected from a variety of hacker's attacks, including a malignant code, e.g., a spyware or an addware, and a virus. That is, if a protection space is created in a client system, a hacker's attack outside the protection space cannot infiltrate into the protection space, and inversely, an attack inside the protection space cannot attack outside of the protection space. That is, two or more seemingly different systems coexist in a single physical system. Feasibility of such a method of creating a protection space is already demonstrated through a virtualization technique. However, in the present invention, the user does not install a virtual machine in the user system in preparation for receiving a service, but it is a feature of the present invention that the service provider automatically and forcibly installs a virtual machine in the user system. Depending on an implementation type, the virtual machine may be installed after the service user approves installation of the protection space.

However, the entire client/server system is not perfectly protected only by creating a protection space using a virtual machine or the like. Once a protection space is installed, although a malignant client application is executed inside the protection space, the client system other than the protection space is not affected, and thus the client system can be regarded as being protected. Additionally, the client application can be protected through verification of client objects, and even the server system can be protected through integrity verification, which will be described below in detail. In these aspects, the protection space used in the present invention can be regarded as a space for protecting a client system, a client application, and/or a server system.

A method of isolating system resources can be used as a method of creating a protection space. Since a malignant application, such as a hacking tool, worm, virus, and the like, a client application, and a general application are executed in the same operating system space, the malignant application can attack the client application and the general application. At this point, an attack on the client application can be blocked by isolating operating system resources. Isolation of the operating system resources is realized by blocking the malignant application from accessing to the operating system resources for the client application, such as processes, registries, files, networks, memory, and the like. In addition, the method of isolation may include a function for preventing theft of important algorithms or values of an application and blocking an attempt to manipulate data or flow of a program using such a technique as an anti-reversing engineering, debugging, or the like.

However, in this specification, a virtualization method is mainly described as a method of creating a protection space. Preferably, an operating system level virtualization method is used. A principal purpose of a conventional operating system level virtualization method is, as described above, server virtualization for providing a completely independent operating system space to a plurality of users. However, the operating system level virtualization method desired to be used in the present invention is different from the conventional operating system level virtualization method in that the major purpose thereof is desktop virtualization where a user efficiently combines and uses a plurality of virtual machines.

If the operating system level virtualization is applied, a client system can be divided into a host operating system and a guest operating system. The host operating system means an operating system installed in a physical system by the user, and the guest operating system means an operating system installed or created in a virtual machine. In order to efficiently use the operating system level virtualization for the desktop virtualization, the guest operating system can use an application installed in the host operating system, and data existing in the host operating system and the guest operating system should be efficiently shared. However, in this case, in order to make the guest operating system reliable as a protection space, there should be provided means for confirming whether resources of the host operating system is secure when the guest operating system uses the resources. The reason is that a client application operating in the guest operating system can be attacked by a hacker residing in the host operating system. In addition, it is preferable to prepare means for verifying whether packets created in the guest operating system are actually created in the guest operating system, not in the host operating system, or whether or not the packets are manipulated in the network.

According to another aspect of the invention, the steps needed for using a service are described below.

First, the user (client) requests using a service from the provider (server).

Second, the provider creates a protection space in the user system and creates a corresponding virtual machine instance in the client's protection space.

Third, the user is provided with a service through a client application installed and executed in the virtual machine.

Here, the user does not need to recognize or confirm whether a protection space, such as a virtual machine or the like, is installed in his or her system, and it is sufficient for the user to confirm only that a client application is installed and executed. However, if needed, installation of the virtual machine may be informed to the user, or approval for the installation may be obtained from the user. If there is a request for protecting the provider system, it occasionally does not need to inform the user that a virtual machine is installed while having the user not feel inconvenience when the virtual machine is installed.

In order to create a protection space, the provider preferably transmits a virtual machine image previously installed with client applications needed for using the service to the client. Needless to say, it is also possible to create an empty protection space by transmitting only a virtual machine image and selectively install client applications, or a virtual machine image containing only those data needed for installation can be transmitted.

According to one aspect of the present invention, a secure virtual machine system is needed to create a protection space. To prove reliability of the data created in the guest operating system, client objects may be verified in order to confirm whether resources of the secure host operating system are used. In addition, integrity verification for securely transmitting and receiving data may be performed, in which it is confirmed whether the data transmitted to the server is created by the guest operating system, not by the host operating system, or whether or not the data transmitted to the server is manipulated in the network.

As shown in FIG. 4, a service providing system comprises a server, a service image, and all or a part of server side integrity verification means, and a service user system comprises a virtual machine, client object verification means, a service image, and all or a part of client side integrity verification means. Hereinafter, a method of implementing each of the constitutional elements will be described in detail. It should be noted that technical terms used in the specification do not intend to restrict or limit technical scopes of the present invention.

Virtual Machine System

A secure virtual machine can be implemented by creating an independent virtual machine instance in the protection space. A guest operating system independent from the host operating system is created using an operating system partitioning technique, and the virtual machine instance is created through a system booting process in a corresponding operating system and disappears through a process of system shutdown.

The term independent used in this specification means independence within a range in which the virtual machine system operates as if a plurality of physical machines is installed with an individual operating system without collision of resources between the host operating system and the guest operating systems. Accordingly, in order to efficiently use system resources, the host operating system and the guest operating systems can share resources, if needed, within the range of not degrading security.

The full virtualization method among conventional virtualization techniques is a hardware level virtualization method that emulates all kinds of hardware constructing a computer (a central processing unit, memory, controller, and the like), and a new operating system should be installed in the emulated machine. Contrarily, the operating system partitioning method is an operating system level virtualization method, and thus a new operating system is not installed, but an operating system that is already installed is partitioned into a plurality of virtual operating systems.

In addition, according to the full virtualization method, a program installed in the host operating system cannot be used in a guest operating system, and a program installed in a guest operating system cannot be used in another guest operating system, and thus the method is inappropriate to accomplish the objects of the present invention in technical and managerial viewpoints.

Execution Environment of Virtual Machine

FIG. 6 is a view showing the configuration of a virtualization method according to a preferred embodiment of the present invention. The execution environment of an independent guest operating system comprises a virtual kernel, an execution space, and virtual machine data.

An embodiment implementing the virtual kernel is virtualizing each constitutional element of the kernel execution unit of the host operating system. The constitutional elements of the kernel execution unit includes files, registries, kernel objects, processes, threads, a virtual memory manager, a configuration manager, an I/O manager, and the like, and the constitutional elements can be varied according to the operating system.

Generally, when an application program process or a device driver needs to use a file, a registry, or an object and asks the kernel execution unit for the element, the kernel execution unit performs a corresponding process. Each constitutional element of the kernel execution unit has a unique identifier. If it is a file, a file name such as \Device\Harddisk Volume1\windows\system32\notepad.exe becomes an identifier, and if it is a registry, a key name such as \Registry\Machine\software becomes an identifier. In the case of a process or a thread, a numeral called as a process identifier (ID) or thread ID becomes an identifier.

In order to virtualize each constitutional element of the kernel execution unit, independence is given to each identifier, and a storage space may be allocated to each virtual machine. For example, space \VM1 is allocated for the file system of a first virtual machine instance, and space \VM2 is allocated for the file system of a second virtual machine instance. If an application program process or a device driver requests access to a file, a virtual machine (VM) kernel manager changes the file name to a file name of the file system of a corresponding virtual machine, and transfers the changed file name to the kernel execution unit. For example, if a process in VM1 requests access to a file \Device\Harddisk Volume1\windows\system32\notepad.exe, the VM kernel manager changes the file name to \VM1\ Device\Harddisk Volume1\windows\system32\notepad.exe and transfers the changed file name to the kernel execution unit, and the kernel execution unit creates a corresponding file in storage space \VM1. As a result, although the requested file name is \Device\Harddisk Volume1\windows\system32\notepad.exe, which is the same in each virtual machine, a file in a virtual machine is different from a file in another virtual machine. Other constitutional elements, such as a registry, kernel object, and the like, are virtualized in the same manner.

In another embodiment implementing a virtual machine, it is not that constitutional elements of a kernel execution unit are virtually divided into a plurality, but the kernel execution unit itself is created one per each virtual machine.

Generally, an operating system running in a CPU that supports a protection mode and a virtual address provides a user mode and a kernel mode. A virtual address space of the user mode is independent in each process, whereas a virtual address space of the kernel mode is global and shared among all processes. For example, since a user process such as the Notepad operates in the user mode, a plurality of the same programs can be executed, and each process has a unique virtual memory space, and thus independent data can be stored in the same virtual memory address. However, since the kernel execution unit is executed in the kernel mode, only one data can be stored at the same virtual memory address, and a plurality of the kernel execution units cannot be executed.

In the present invention, the kernel manager places a VM Engine Memory Manager between the physical memory and the kernel execution unit in order to solve the problem. The VM Engine Memory Manager puts virtual memory spaces of kernel mode elements but the kernel execution unit as global, and has a virtual memory space of the kernel execution unit be independently exist in each virtual machine as it does in the user mode, thereby allowing different values to be stored in the same memory address and making it possible to execute one kernel execution unit in each virtual machine. Of course, part of virtual memory can be shared for efficient use of memory resources.

A complete guest operating system environment is ultimately ready through a system booting process after a virtual kernel is created in each virtual machine using the technique described in the above-mentioned embodiment. The booting process follows the booting process of the host operating system. Generally, the booting process includes all or some of such processes as checking hardware used in each virtual machine, loading subsystems, delayed updating, executing system processes, executing service processes, executing user processes, and loading device drivers.

The delayed updating means that a resource, such as a file or the like, cannot be deleted or updated if the resource is in use, and the resource is generally deleted or updated in the next booting process after the system is turned off. The system process is a core process needed for providing an operating system environment, which is a process being in charge of user account management, logon processing, session management, service management, and the like. For example, the system process corresponds to such processes as lsass.exe, winlogon.exe, and smss.exe in Windows operating systems of Microsoft. The service process is executed in the background and provides functions needed by other application programs, which includes a DCOM/RPC service, a printer spooler service, and the like.

Although the system process or the service process can execute all processes in a virtual machine, they can share a process that is already executed in the host operating system or another virtual machine in order to efficiently use the overall system resources. For example, if an account management system process is executed in each virtual machine, an independent account exists in each virtual machine. However, if the account management process shares a process in the host operating system, the ID/password account information of the host operating system is shared among the guest operating systems.

In order to share the system process or the service process, access to all global objects existing in a corresponding process should be mapped to an object of a shared process. For example, a naming pipe or the like for controlling a printer exists in the printer spooler service process, and if a notepad process in the guest operating system requests printing of a document, a connection to the naming pipe of the spooler service in the guest operating system is basically tried. However, the spooler service does not exist in the guest operating system, but a spooler service in the host operating system is shared, and thus such a request should be mapped to the spooler service in the host operating system.

A kernel application program such as a device driver or the like also can be loaded onto each guest operating system. In the case of the kernel application program, a global virtual address space problem can be occurred in the same manner as the kernel execution unit. In order to solve the problem, if needed, the VM Engine Memory Manager in the VM kernel manager can localize the virtual address space.

In the step of executing a user process, an application program of the service provider or an application program of the user is executed in the guest operating system.

The system shutdown process follows the shutdown process of the host operating system. The system shutdown process needs to terminate user processes, terminate service and system processes, unload device drivers, and release a variety of resources.

If the virtualization method of the present invention is used, the size of a virtual machine image can be considerably decreased. Implementing a virtual machine image in a conventional virtualization method requires data for creating an operating system. Windows of Microsoft currently needs about 600M bytes to 4G bytes of data to create an operating system, and Linux needs tens of mega bytes to some giga bytes of data. However, according to the virtualization method of the present invention, data is not needed to create an operating system. Therefore, a technique of forcibly creating a protection space in a user system by the provider is practical.

Constitutional Elements of Virtual Machine

Constitutional elements of a virtual machine include a setting manager, a desktop environment, an application program template, user data, and temporary data, and a virtual machine is constructed by putting together the constitutional elements.

The setting manager manages a variety of settings of the virtual machine. Setting items are inputted by the user or provided by the provider.

The desktop environment includes a background screen, a theme, a window style, background music, and the like. A plurality of virtual machines and guest operating systems can be simultaneously run in a user system, and thus the desktop environment should provide a desktop integration function. The desktop integration is a function of integrating start menus, background screen icons, and the like existing in each guest operating system into those of the host operating system, and displaying the integrated menus, background screen icons, and the like. A background image, background music, a window style, or the like is selected from those of guest operating systems in execution.

The application program template includes pre-installed application program images and shard library images managed by standard platform providers. Application programs needed for using a provider's service are installed in the application program template, and the application program template is transmitted from the service server to the user system when the user requests using the service from the provider.

Conventionally, an installation process is required to use an application program. For example, when installing Microsoft Office, office application programs should be directly installed in a user's PC by executing an installation file, such as setup.exe or autorun.exe, from an installation compact disk (CD). Using the present invention, an application can be used without such an installation process. For example, if office application programs are installed in a conventional method in a virtual machine for creating an application program template, a result thereof is stored in an application program image. If the application program image is loaded in a general virtual machine, the office application programs can be immediately used without installation.

Generally, in order to execute an application program, other application programs or shared libraries are needed. For example, Internet Explorer, a .NET framework, or the like is needed to use a program related to the Microsoft Office. If a method of creating a shared library image and linking the shard library image to an application program is employed, instead of redundantly installing the shared libraries in each application program image, resources can be efficiently utilized.

Every user uses a different virtual machine environment. For example, a certain machine may already have a specific shared library image, and others may not. The host operating system may be based on Windows XP or Windows 2000. Accordingly, in order for a template created in a virtual machine for creating a template to be smoothly operated in a variety of virtual machines, standard platform providers should provide a standard virtual machine environment, and an application program template should be operated on a standard platform.

The user data image stores data created by the user in the process of using a provider's service through a virtual machine, such as a variety of document files, user defined files, files' and registries of software installed by the user himself or herself, and the like.

A temporary data image stores data created in the process of executing a virtual machine, which can be deleted after the data is temporarily used. The desktop environment, the application program template, and the user data can be loaded onto different virtual machines or shared. However, the temporary data is created in the process of executing a specific virtual machine, and therefore cannot be shared.

As shown in FIG. 7, the application program template, the user data, and the temporary data are hierarchical. For example, in the case of a file system, a host operating system file, files in the standard platform provider, files in application program images, user data files, and temporary data files are piled in the file system stack. If an application program requests a file c:\windows\system32\notepad.exe, a corresponding file is searched for from the temporary data, and if the file does not exist in the temporary data, the file is searched for from the user data file, and if the file does not exist in the user data file, the file is searched for from the application program data file, and if the file does not exist in the application program data file, the file is searched for from the host operating system file. Other kernel constitutional elements, such as registries, kernel objects, and the like, operate in the same manner.

Files, registries, memory, and other data can be stored in an application program template image, user data image, or temporary data image. Each image can be stored in the form of a single file or a plurality of files, or directly recorded onto sectors of a physical storage medium. A storage space can be pre-allocated as much as a size needed to initially create an image or dynamically increased as much as needed while using a virtual machine.

Entire or a part of a virtual machine image can be stored or cached in a fixed hard disk drive, a portable hard disk drive, a file storage server connected through a network, or the like. If the user selects the portable disk or the file storage server connected through a network as an image storage device, and another system other than the currently used system uses the same service, the user can reproduce and use an environment that is being used in an existing system by connecting to the portable storage apparatus or the file storage server and loading a data image or an application image. An application program installation environment can be reproduced using an application program image, and document files and other data being in progress can be used as are through a user data image. The standard platform providers compensate differences among different systems.

Using an image caching function, only a currently needed part of the entire image can be transmitted from the server to the client, and a virtual machine can be executed using the transmitted part. If a plurality of service providers uses the same application program template, the user can use an image cache transmitted in the process of using other providers services, thereby enhancing network transmission efficiency. If the user does not store a cached image into a fixed hard disk, but in a portable storage apparatus such as a universal serial bus (USB) drive, when the user uses the same service used in another system, the user can promptly use the service through the image cached in the portable storage apparatus.

Verification of Client Object

A client object is verified to provide a secure guest operating system environment, in which a verification list containing execution files, document files, objects, DLLs, and the like that can be loaded onto the guest operating system is managed. According to a conventional full virtualization technique, the guest operating system created as a virtual machine and the host operating system respectively are regarded as completely separated two systems that do not share any resource. However, according to the operating system level virtualization method used in the present specification, since the guest operating system shares a part of host operating system resources, verification of a client object is requested to examine whether the shared resources of the host operating system are secure.

The client object verification prevents a malignant user who knows that a client application shares the host operating system resources from accessing to the host operating system resources used by a client application and manipulating data, thereby preventing manipulation of packets transmitted to the server as a result. Inversely, since data that is required to be securely protected, such as confidential documents or semiconductor design circuits, can exist in the host operating system, if an object of the host operating system to which the guest operating system desires to access is not a permitted one, the access can be blocked through client object verification.

A virtual machine setting manager can set a security level of a virtual machine, and a security option can be divided into all-permissive, host verification, and overall verification. In the case of all-permissive, any file can be executed or loaded onto the guest operating system. In the case of host verification, availability of objects shared with the host operating system, such as files, registries, or the like, are verified before being used in the guest operating system. If an object of the host operating system to be accessed is an object for which the service provider does not have a right to access, such as a confidential material, a user screen, or the like, the access is blocked. If an object of the host operating system to be accessed is a malignant code or is infected with a malignant code, or if the object is a file that does not exist in a reliable list, the access can be blocked based on the security policy of the virtual machine setting manager. In this case, the service server copies a secure file that is not infected with a malignant code to the virtual machine and proceeds to the next step using the copied file. In the overall verification, objects existing in the guest operating system, as well as such objects as files, registries, or the like shared with the host operating system, are verified before being used.

An embodiment of the verification is using an electronic signature. If an electronic signature value for file contents is attached on a specific part of the file, whether the file is reliable can be confirmed by verifying the corresponding electronic signature value. The electronic signature may not be recorded in a specific part of the file, but a verification list recording an electronic signature together with a file name can be managed.

Another embodiment of the verification is using a hash value. If a hash value for file contents is attached on a specific part of the file, whether the file is reliable can be confirmed by recalculating a corresponding hash value with the same algorithm and verifying whether the hash values are matched. The hash value may not be recorded in a specific part of the file, but a verification list recording a hash value together with a file name can be managed.

Another embodiment of the verification is using simple information, such as a file name, date of creation, and the like, to verify an object.

As a result of verification, if an object is not secure, the access is blocked based on an access control rule, or the server installs a secure resource in the guest operating system, and the secure resource is used. After the server transmits a secure resource to the client, the guest operating system uses the transmitted resource.

Verification of Integrity

Integrity is verified to provide a secure service environment to the user and the provider, in which client side integrity verification interacts with server side integrity verification, thereby verifying data transmitted and received between the server and the client. The integrity verification creates a security tunnel between the server and the client, thereby blocking an attack on the client and the server.

If only client objects are verified as described above, there is no means for protecting an attack on the server. In order to safely protect service provider's software executed in a virtual machine, only corresponding software should be executed in the virtual machine, and a malignant code or the like should not be executed therein. Accordingly, details of service provider's software are recorded in a verification list, and only verified objects should be permitted to be used. In this case, whenever the software is updated, also the verification list should be updated, which is inconvenient to manage.

Accordingly, if integrity verification is adopted, the server can be protected from an attack, and a client application program of the service provider also can be protected.

Referring to FIG. 5, an embodiment of the present invention adopting the integrity verification will be described. Generally, a client/server system comprises a client side system 500 and a server side system 550, and the client side system is connected to the server side system through a network 532. The client side system 500 comprises a client application 521 and an operating system that can execute the client application, and an application execution space is divided into a general application execution space 510 and a protection space 520. A general application 511, a hacking tool 512, and other software 513 can be executed in the general application execution space 510, and a client application 521 and integrity verification means 522 are executed in the protection space 520. Until today, hacking on the server side system 550 has been performed in such a manner that a hacker 533 manipulates the client application 521 or executes the hacking tool 512 to create a malignant packet 531 and attacks the server side system 550 by transmitting the malignant packet. Accordingly, as described above, an existing server system security product placed at an end of the server examines received network packets and determines whether to accept the packets, or removes vulnerability itself of a server application 551.

In the general application execution space 510, a hacker can freely manipulate an application being executed and execute any application within the space. However, only the predetermined client application 521 can be executed in the protection space 520, and a hacking tool, malignant code, or adware cannot infiltrate into the protection space, and thus the client application 521 can be protected from a hacker's attack.

However, when only the packets created by the client application 521 within the protection space 520 are permitted to be transmitted to the server side system and all network packets created by the other applications 511, 512, and 513 are blocked, the server side system 550 can be protected to some extent. In addition, although it is a secure network packets 530 created within the protection space 520, the packet is transmitted to the server side system 550 through a variety of network transmission sections 532, and thus the hacker 533 can falsify the packet or insert a malignant code in the network transmission section 532. Accordingly, integrity verification is required, which guarantees that the hacker 533 has not falsified the packet created by the client application 521 within the protection space 520 while the packet passes through the network transmission section 532.

Integrity verification is divided into client side integrity verification 522 and server side integrity verification 540, and the two parts interact with each other to verify integrity.

An embodiment of the integrity verification is encryption. FIG. 8 is a view showing a preferred embodiment of integrity verification. In order to prevent the hacker 860 from manipulating packets, thereby attacking the client application 800 and the server application 850, in the process of transmitting network packets created by the client application 800 executed in the protection space 520 and packets created by the server application 850, data transmitted and received between the client and the server is encrypted. The network packets created by the client application 800 are encrypted by the client side encryption means 810 and transmitted to the server side. The transmitted packets are decrypted by the server side decryption means 840 and transmitted to the server application 850. The network packets created by the server application 850 are encrypted by the server side encryption means 830 and transmitted to the client side. The transmitted packets are decrypted by the client side decryption means 820 and transmitted to the client application 800. In this case, the hacker absolutely cannot forge or falsify the transmitted network packets in the network section between the client and the server.

Another embodiment of the integrity verification is using a hash as shown in FIG. 9. When network packets created by the client application 900 are transmitted to the server application 930, the client side integrity information attach module 910 attaches an integrity verification value calculated using the transmission network packets to the network packets and transmits the packets attached with the integrity verification value to the server side. If the hacker 940 forges or falsifies 941 the packets in the process of transmission, the integrity verification value calculated using the packets by the server side integrity information confirming module 921 will be different from the integrity verification value calculated and attached by the client side integrity information attach module 910 using the packets. In this case, the server side integrity information confirming module 921 determines that the transmitted network packets are forged or falsified and discards the packet. If the integrity verification values are the same, the transmitted packets are transmitted to the server application 930.

When the network packets are transmitted from the server application 930 to the client application 900, the server side integrity information attach module 920 attaches an integrity verification value calculated using the transmission network packets to the network packets and transmits the packets attached with the integrity verification value to the client side. If the hacker 940 forges or falsifies 941 the packets in the process of transmission, the integrity verification value calculated by the client side integrity information confirming module 911 using the packets will be different from the integrity verification value calculated and attached by the server side integrity information attach module 920 using the packets. In this case, the client side integrity information confirming module 911 determines that the transmitted network packets are forged or falsified and discards the packet. If the integrity verification values are the same, the transmitted packets are transmitted to the client application 900.

In the current server application security system, all transmitted packets are examined in layer 7 (the application layer) of OSI 7 layers to confirm whether malignant contents are contained in the packets, and thus a lot of computing time is required, thereby degrading performance of the server system. However, in the present invention, such a calculation is not required, and thus the server system can be protected without degrading performance of the system.

Advantageous Effects

To protect the service user system, which is one of objects of the present invention, is realized through the protection space installation described above. Although service provider's software is a malignant code or infected with a malignant code, or an unknown code for attacking vulnerability is concealed in the service provider's software, the host operating system can be protected from being infected. The user system can be further securely protected by additionally verifying client objects. If an object of the host operating system that a guest operating system is to access is not permitted (e.g., a confidential document), the access can be blocked through client object verification.

To protect the service provider system, which is another object of the present invention, is realized through the protection space installation and the integrity verification described above. The service provider creates a secure guest operating system environment in the user system and executes a client application within the guest operating system, thereby protecting the client application from malignant codes and hacking programs existing in the host operating system. In addition, only those network packets created within the secure guest operating system are accepted through integrity verification, the server can protect itself from external attacks. Client objects are additionally verified to prevent a malignant user from manipulating the client application, thereby further securely protecting the provider system in the long run.

To simultaneously protect the service provider system and the service user system, which is another object of the present invention, is realized through the protection space installation, client object verification, and integrity verification described above. Therefore, a most ideal security system pursued by the present invention is completed.

To conveniently distribute software and allow the user to easily and promptly use of the software, which is another object of the present invention, is realized by transmitting a virtual machine image. In order for a person to install individually needed software and adjust a variety of program settings by himself or herself, knowledge of an expert is required. In the present invention, the service user does not construct by himself or herself a software environment for using a service, but the service provider constructs an environment optimized to the service, and the service user is allowed to use the constructed environment as is. Accordingly, even a user who is not accustomed to a computer can immediately use the service through an application template transmitted by the service provider, without a complicated conventional software installation process, and the user can promptly and conveniently use the service using a caching function and a portable drive or a file server storage function.

BRIEF DESCRIPTION OF THE DRAWINGS

Further objects and advantages of the invention can be more fully understood from the following detailed description taken in conjunction with the accompanying drawings in which.

BEST MODE FOR CARRYING OUT THE INVENTION

Figure 1:
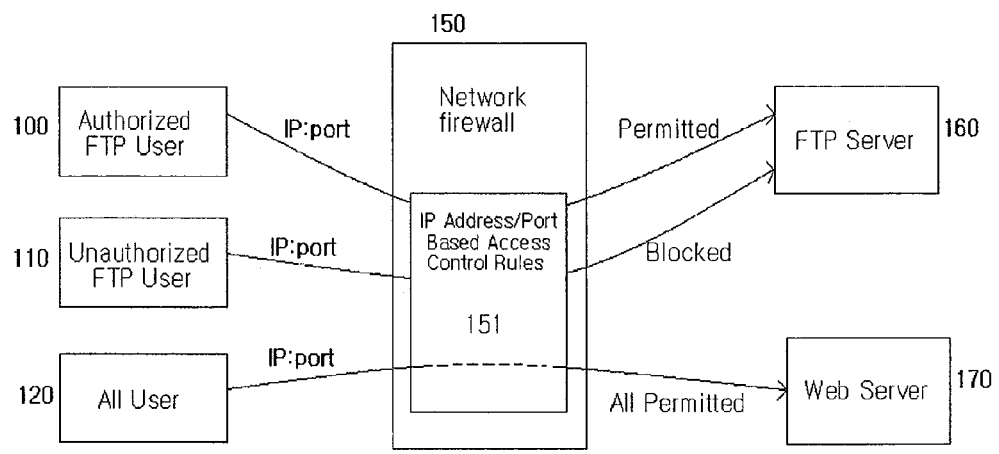
FIG. 1 is a view schematically showing the operation of a conventional network firewall.
Figure 2:
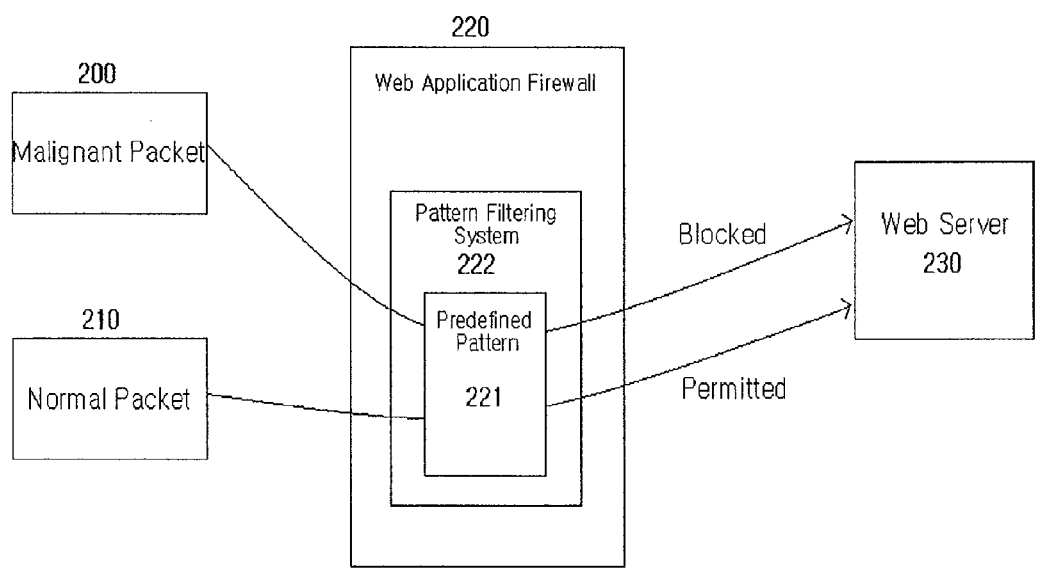
FIG. 2 is a view schematically showing the operation of a conventional web application firewall.
Figure 3:
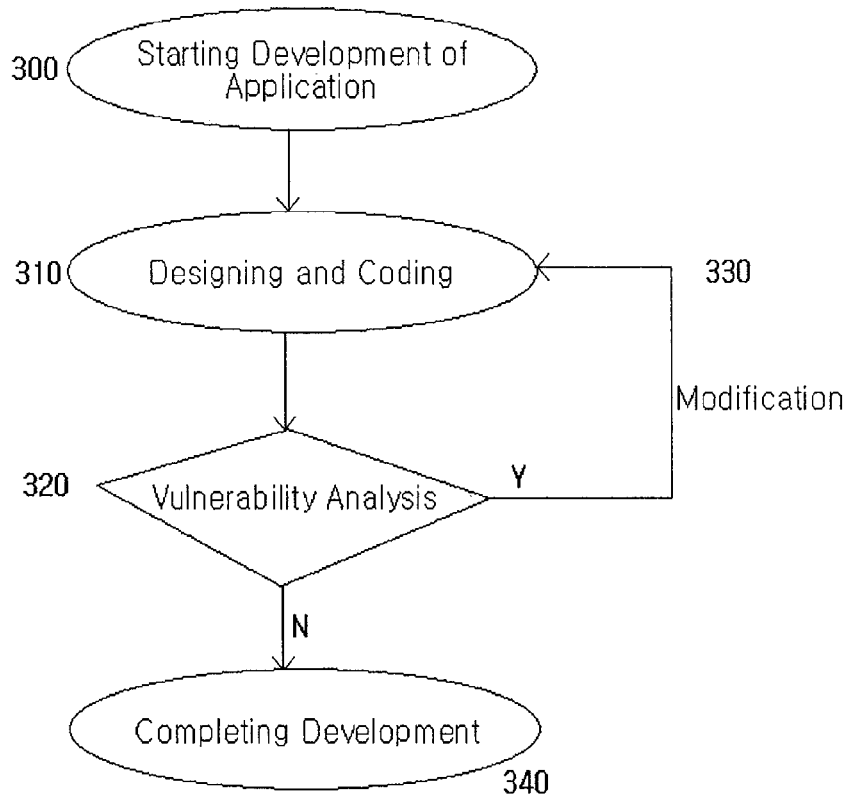
FIG. 3 is a view schematically showing the process of developing an application using a conventional vulnerability scanner and a source code analysis tool.
Figure 4:
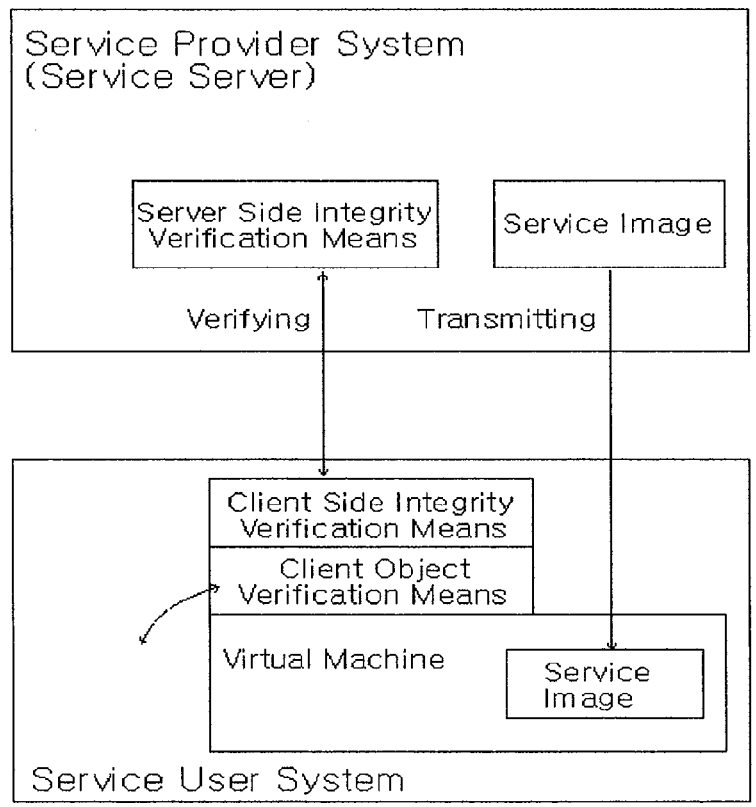
FIG. 4 is a view showing a preferred embodiment of a server system and a client system of the present invention.
Figure 5:
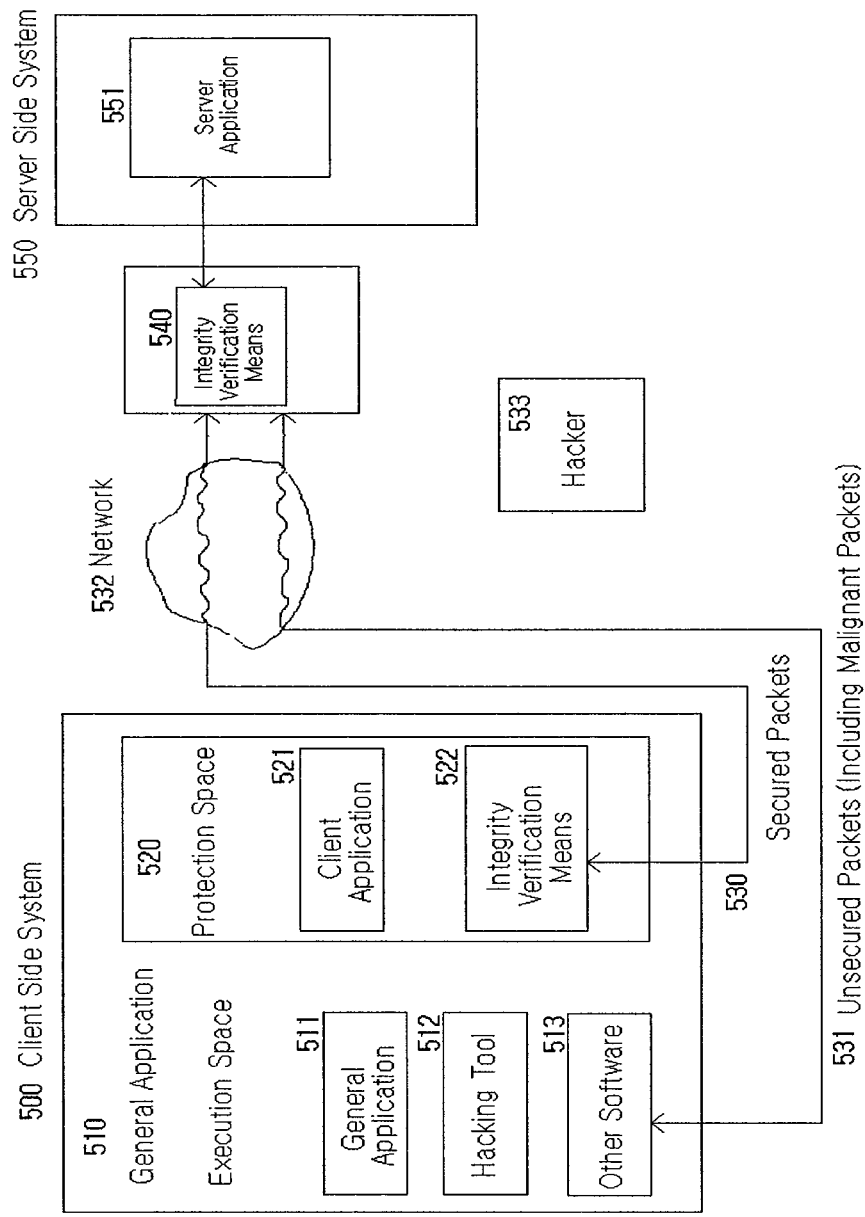
FIG. 5 is a view showing a preferred embodiment of system integrity verification of the present invention.
Figure 6:
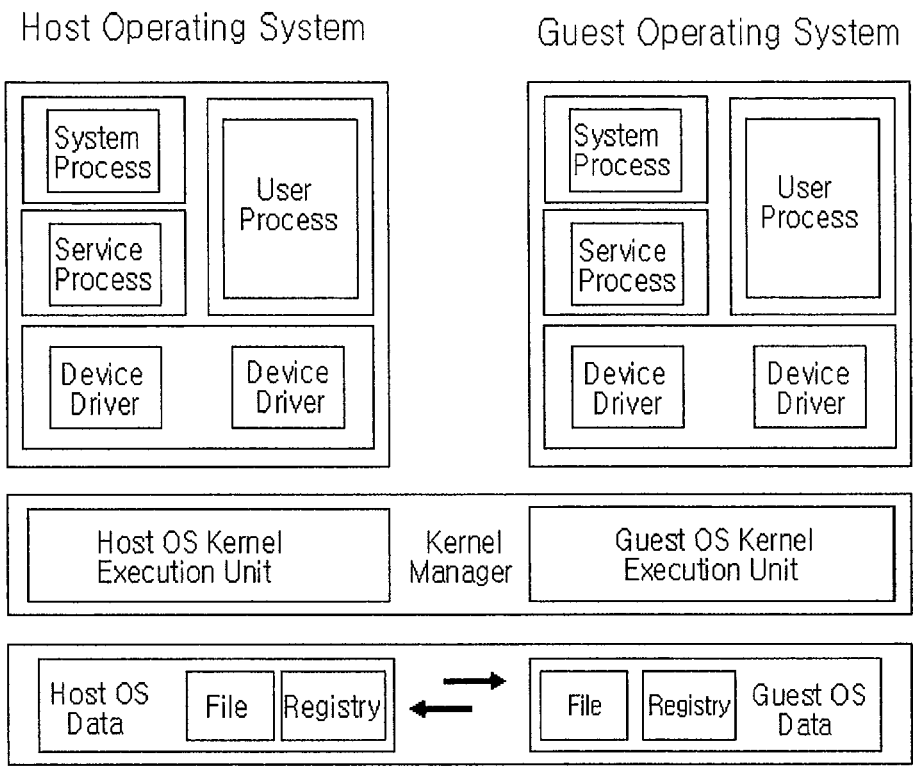
FIG. 6 is a view showing a preferred embodiment of an operating system level virtualization method of the present invention.
Figure 7:
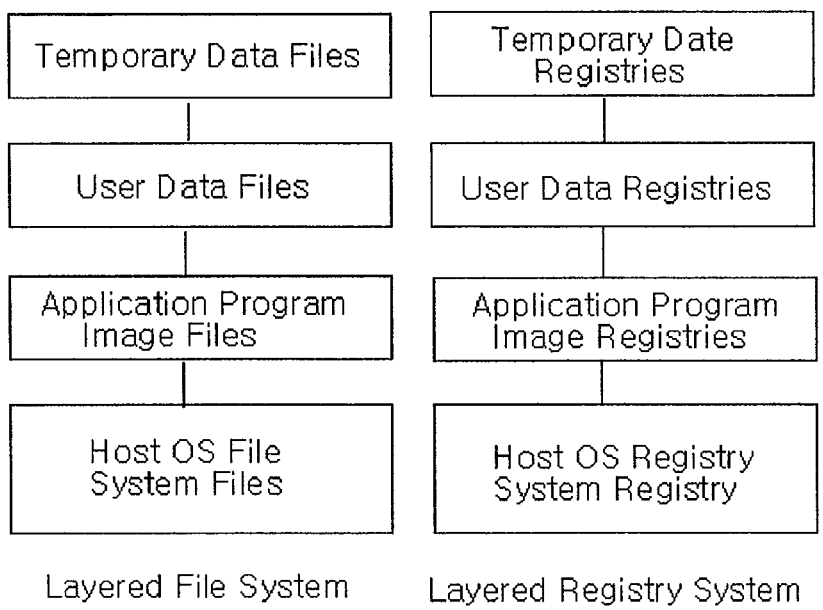
FIG. 7 is a view showing layered data according to a preferred embodiment of the present invention.
Figure 8:
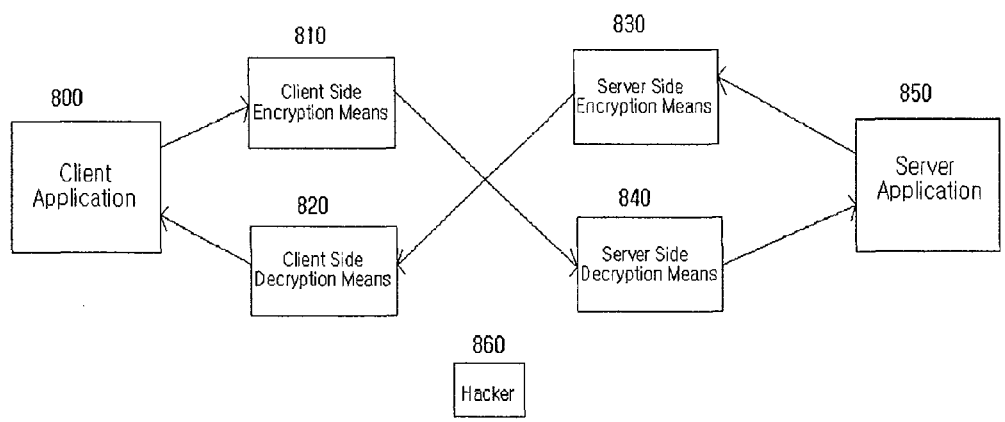
FIG. 8 is a view showing a preferred embodiment implementing integrity verification of the present invention.
Figure 9:
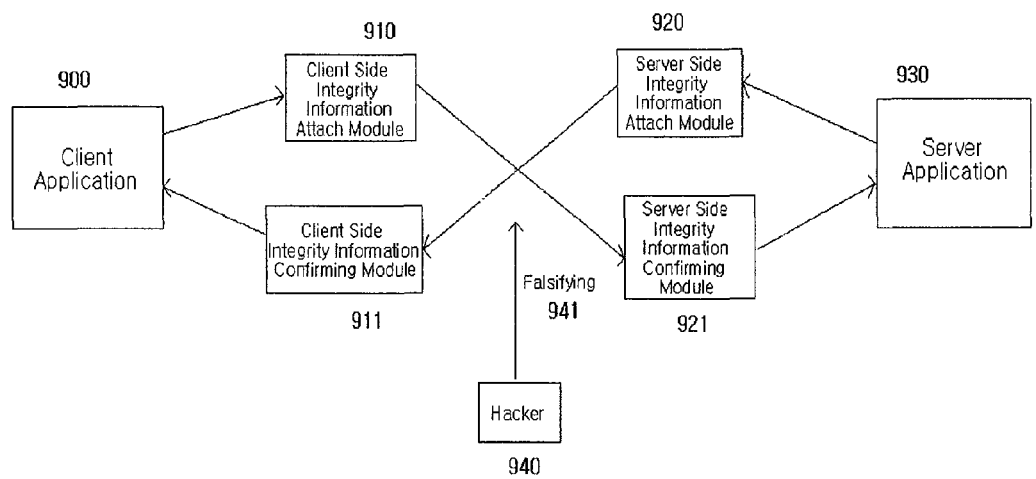
FIG. 9 is a view showing another preferred embodiment implementing integrity verification of the present invention.

According to a preferred embodiment of the present invention, if a user requests using a service, the provider transmits a virtual machine image to the user system. The transmitted virtual machine image creates a virtual machine instance, and client applications previously installed in the service image are executed.

Since the client applications are executed within the virtual machine, although the software is a malignant code or infected with a malignant code, the user system is securely protected, and the user can easily, promptly, and conveniently use the service without a complicated installation process.

Particularly, virtualizing a customer service environment through the Internet is useful. For example, in an Internet banking method of a conventional technique, a user should install a certificate application and a variety of security programs if the user desires to use Internet banking. However, a variety of the installed security programs does not efficiently protect information of the user or provider from hacking. However, if a virtual machine previously installed with a variety of applications needed for the Internet banking is used, the user can use the service of the provider in an easy and speedy way and securely protect the system from hacking. The same method can be applied to most of customer services that use the Internet, such as Internet banking, Internet shopping, Internet stock trading, and the like.

Mode for the Invention

In an embodiment of the present invention, client object verification is added to a preferred embodiment described above. Through the client object verification, a secure guest operating system environment can be created, and a process in the guest operating system can be prevented from accessing to important resources of the host operating system, the inverse of which is also possible. In addition, the client application can be securely protected from a malignant code or a hacking program installed in the host operating system or from manipulations of a hacker.

In another embodiment of the present invention, integrity verification is added to a preferred embodiment described above. Through the integrity verification, attacks on the server and the client through the network can be prevented, and thus a most secure system can be provided. Through the integrity verification, the server receives only those data that is created in the protection space and not manipulated in the course of transmission.

According to another embodiment of the present invention, a virtual machine image previously installed with a plurality of programs requested by a user is transmitted from the provider to the user system. Conventionally, software is distributed in such a manner that a software manufacturer or a distributor sells software in an online or offline store, and a purchaser receives an installation CD of the software by mail, electronic file download, or the like, installs the software in his or her PC by himself or herself, and uses the software. If a software seller distributes software in a virtual machine image form or in a standard virtual machine form including a group of required software in a virtual machine, even a user who is not familiar with a computer can use the PC in a easy and speedy way as he can with general appliances. The user's request includes previously determining the types of one or more programs to be installed and certain setting details of each program. The provider previously installs one or more programs and setting details thereof requested by the user in a virtual machine, and transmits them to the user system whenever the user requests.

Each user's virtual machine image custom-tailored in response to the request of the user can be separately stored in the server. Accordingly, if the user needs to reinstall a program due to breakdown of the system or malfunction of the operating system, the system can be promptly restored only by retransmitting the stored virtual machine image from the server.

According to another embodiment of the present invention, working environments of an enterprise is virtualized using intranet environments within the enterprise and extranet environments outside the enterprise. In this case, the user can be employees of the enterprise, external manpower of a cooperative company, or the like, and the provider is a person in charge of IT in the enterprise. Conventionally, the user should obtain software needed for business and individually install the software to construct a working environment. However, using the system of the present invention, the user can easily use a previously set working environment through a virtual machine created for the business by the provider. The provider can easily manage version control or maintenance of the applications to be distributed within the enterprise, thereby saving IT management cost of the enterprise. In addition, if working spaces are virtualized, created business materials are kept only within the virtual machine and thus leakage of the materials also can be prevented. In addition, when the user needs to use a public PC at a PC caf, hotel, or the like while the user is on a business trip or working outside of the enterprise, the user can immediately reproduce the same working environment using a virtual machine image. If the user stores the virtual machine image into an image server and delete the virtual machine image from the public PC after doing the work, all business details are removed from the PC, and thus leakage of enterprise materials to other users can be prevented. Although a hacking tool is installed in the public PC, since inside of the virtual machine is secure, the user can attend to the business without anxiety.

Although the present invention has been described with reference to several preferred embodiments, the description is illustrative of the invention and is not to be construed as limiting the invention. Various modifications and variations may occur to those skilled in the art, without departing from the scope of the invention as defined by the appended claims.

INDUSTRIAL APPLICABILITY

The present invention can be applied to a variety of fields, such as various electronic commerce systems operating in a server-client paradigm using an Internet environment, e.g., home shopping or home banking, security products for protecting documents or other data of an enterprise or a government agency, distribution of various kinds of software, and the like.

The invention claimed is:

1. A method for providing at least one client with a service, for which at least one server computer in communication with a computer network is provided, the method performed by the server comprising the steps of:
   receiving a request for the service,
   creating a protection space within the client through the computer network in response to the request, and
   providing the requested service to the protection space while the client is connected to the computer network, wherein providing the requested service comprises network communication with the client executing one or more first computer programs in the protection space;
   wherein the protection space created by the server is configured to protect the one or more first computer programs executed by the client in the protection space from one or more second computer programs executed by the client outside of the protection space when the one or more first computer programs are executed by the client in the protection space for providing the service to the client; and
   wherein the protection space created by the server is configured to protect the one or more second computer programs executed by the client outside of the protection space from the one or more first computer programs executed by the client in the protection space when the one or more first computer programs are executed by the client in the protection space for providing the service to the client.

2. The method according to claim 1 wherein creating a protection space comprises:
   transferring data for creating a virtual machine to the client, wherein the data is for booting the virtual machine in the client,
   wherein the protection space is formed by the virtual machine.

3. The method according to claim 2 wherein the data for creating the virtual machine includes at least part of data for applications required for providing the client with the service.

4. The method according to claim 2 wherein the virtual machine is created by virtualizing an operating system of the client.

5. The method according to claim 4 wherein the virtual machine comprises a layered combination of at least one image selected from the group of an operating system image, an application program template image, a user data image and a temporary data image.

6. The method according to claim 5 wherein the application program template image comprises a pre-installed application program image or a shared library image required for providing the client with the service.

7. The method according to claim 4 wherein virtualizing the operating system of the client comprises virtualizing a memory of a kernel execution unit.

8. The method according to claim 1 wherein the protection space is created by isolating resources of an operating system of the client.

9. The method according to claim 1, the method further comprising:
   providing the client with a client entity verification means, the client entity verification means performing:
      verifying whether at least part of the resources, objects or user data from outside of the protection space are secured, and
      if secured, allowing at least part of the resources, objects or user data from outside of the protection space to be shared with the protection space.

10. The method according to claim 1, the method further comprising:
    providing the client with a protection space entity verification means, the protection space entity verification means performing:
       verifying whether at least part of the resources, objects or user data from inside of the protection space are secured, and
       if secured, allowing at least part of the resources, objects or user data from inside of the protection space to be shared with outside of the protection space.

11. The method according to claim 1 wherein the server receives only packets created in the protection space when the server receives packets from the client for the service.

12. The method according to claim 1, the method further comprising:
    verifying integrity of at least part of data traveling between the server and the client.

13. The method of claim 1 wherein said protecting of the one or more first computer programs and the one or more second computer programs is effective for protecting at least one first computer program and at least one second computer program from each other as the at least one first computer program shares a resource with the at least one second computer program in the service being provided to the client.

14. A computer program product for providing at least one client with a service by a server in communication with a computer network, comprising program instructions stored on at least one non-transitory computer readable storage medium which when executed cause a computer to:
    receive a request for the service;
    create a protection space within the client through the computer network in response to the request; and
    provide the requested service to the protection space, wherein providing the requested service comprises network communication with the client executing one or more first computer programs in the protection space;
    wherein the protection space created by the server is for protecting the one or more first computer programs executed by the client in the protection space from one or more second computer programs executed by the client outside of the protection space when the one or more first computer programs are executed by the client in the protection space for providing the service to the client; and wherein the protection space created by the server is for protecting the one or more second computer programs executed by the client outside of the protection space from the one or more first computer programs executed by the client in the protection space when the one or more first computer programs are executed by the client in the protection space for providing the service to the client.

15. The computer program product according to claim 14 further comprising program instructions for:

transferring data for creating a virtual machine to the client;

wherein the data is for booting the virtual machine in the client, wherein the protection space is formed by the virtual machine.

16. The computer program product of claim 14 wherein said protecting of the one or more first computer programs and the one or more second computer programs is effective for protecting at least one first computer program and at least one second computer program from each other as the at least one first computer program shares a resource with the at least one second computer program in the service being provided to the client.

17. A server for communicating with at least one client over a computer network to provide the client with a service, the server comprising:

a receiver for receiving a request for the service, a transmitter for transmitting data for creating a protection space to the client through the computer network in response to the request, and a service provider for providing the requested service to the protection space, wherein providing the requested service comprises network communication with the client executing one or more first computer programs in the protection space;

wherein the protection space created by the server is for protecting the one or more first computer programs executed by the client in the protection space from one or more second computer programs executed by the client outside of the protection space when the one or more first computer programs are executed by the client in the protection space for providing the service to the client; and wherein the protection space created by the server is for protecting the one or more second computer programs executed by the client outside of the protection space from the one or more first computer programs executed by the client in the protection space when the one or more first computer programs are executed by the client in the protection space for providing the service to the client.

18. The server of claim 17 wherein said protecting of the one or more first computer programs and the one or more second computer programs is effective for protecting at least one first computer program and at least one second computer program from each other as the at least one first computer program shares a resource with the at least one second computer program in the service being provided to the client.

\* \* \* \* \*